(12) United States Patent
Yamazaki et al.

(10) Patent No.: US 11,858,292 B2
(45) Date of Patent: Jan. 2, 2024

(54) HUB ASSEMBLY FOR HUMAN-POWERED VEHICLE

(71) Applicant: Shimano Inc., Osaka (JP)

(72) Inventors: Azusa Yamazaki, Osaka (JP); Kazutaka Niki, Osaka (JP); Takeshi Ueda, Osaka (JP)

(73) Assignee: Shimano Inc., Osaka (JP)

( * ) Notice: Subject to any disclaimer, the term of this patent is extended or adjusted under 35 U.S.C. 154(b) by 320 days.

(21) Appl. No.: 17/459,366

(22) Filed: Aug. 27, 2021

(65) Prior Publication Data
US 2023/0061862 A1    Mar. 2, 2023

(51) Int. Cl.
| | |
|---|---|
| *H02K 11/33* | (2016.01) |
| *B60B 27/00* | (2006.01) |
| *B60B 27/02* | (2006.01) |
| *B62J 45/00* | (2020.01) |
| *H02K 7/18* | (2006.01) |
| *B60B 27/04* | (2006.01) |
| *B62K 23/00* | (2006.01) |
| *H02K 7/00* | (2006.01) |
| *H02K 7/08* | (2006.01) |
| *H02K 11/00* | (2016.01) |

(52) U.S. Cl.
CPC ...... *B60B 27/0047* (2013.01); *B60B 27/0005* (2013.01); *B60B 27/023* (2013.01); *B60B 27/04* (2013.01); *B62J 45/00* (2020.02); *B62K 23/00* (2013.01); *H02K 7/006* (2013.01); *H02K 7/083* (2013.01); *H02K 7/1861* (2013.01); *H02K 11/33* (2016.01); *H02K 11/0094* (2013.01)

(58) Field of Classification Search
CPC .......................... H02K 7/006; H02K 7/1846
See application file for complete search history.

(56) References Cited

U.S. PATENT DOCUMENTS

| | | | | |
|---|---|---|---|---|
| 7,042,123 | B2 * | 5/2006 | Kitamura | H02K 7/1846 280/260 |
| 8,884,481 | B2 | 11/2014 | Hasegawa | |
| 10,654,314 | B2 | 5/2020 | Nakajima et al. | |
| 10,787,032 | B2 * | 9/2020 | Yamazaki | B62M 6/50 |
| 11,535,337 | B2 * | 12/2022 | Van Druten | B60B 35/04 |
| 11,643,159 | B2 * | 5/2023 | Yamazaki | H02K 21/227 310/67 A |
| 2002/0185909 | A1 | 12/2002 | Nishimoto | |
| 2008/0100183 | A1 * | 5/2008 | Kitamura | B62J 6/12 310/67 A |
| 2018/0170099 | A1 * | 6/2018 | Yamazaki | B62J 6/12 |
| 2018/0362108 | A1 | 12/2018 | Yamazaki | |
| 2020/0238756 | A1 | 7/2020 | Nakajima et al. | |

* cited by examiner

*Primary Examiner* — Dang D Le

(74) *Attorney, Agent, or Firm* — Global IP Counselors, LLP

(57) ABSTRACT

A hub assembly is provided for a human-powered vehicle. The hub assembly is basically provided with a hub axle, a hub body, an electric component and a user input device. The hub body is rotatably mounted on the hub axle to rotate around a rotational center axis of the hub assembly. The user input device is electrically coupled to the electric component.

25 Claims, 11 Drawing Sheets

HUB ASSEMBLY FOR HUMAN-POWERED VEHICLE

BACKGROUND

Technical Field

This disclosure generally relates to a hub assembly for a human-powered vehicle.

Background Information

Some wheels for human-powered vehicles (e.g., bicycle) have a hub, a plurality of spokes and an annular rim. The hub has a hub axle that is non-rotatably mounted to a frame of the human-powered vehicle. The hub has a hub body that is coaxially coupled to the hub axle so that the hub body is disposed radially outwardly with respect to the hub axle. The bearings are configured and arranged to support the hub body so that the hub body can freely rotate around the hub axle. In almost all types of bicycles except fixed gear and track racers, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a hub assembly for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub assembly is provided for a human-powered vehicle. The hub assembly basically comprises a hub axle, a hub body, an electric component and a user input device. The hub body is rotatably mounted on the hub axle to rotate around a rotational center axis of the hub assembly. The user input device is electrically coupled to the electric component.

With the hub assembly according to the first aspect, a user can easily input a signal to the electric component via the user input device.

In accordance with a second aspect of the present disclosure, the hub assembly according to the first aspect is configured so that the electric component includes an electric circuit board, and the user input device is electrically connected to the electric circuit board.

With the hub assembly according to the second aspect, various electrical parts of the electric component can be interconnected using the electric circuit board.

In accordance with a third aspect of the present disclosure, the hub assembly according to the first aspect or the second aspect is configured so that the electric component is non-rotatably disposed with respect to the rotational center axis.

With the hub assembly according to the third aspect, it is possible to more reliably protect the electric component by preventing rotational movement with respect to the rotational center axis.

In accordance with a fourth aspect of the present disclosure, the hub assembly according to any one of the first aspect to the third aspect is configured so that the electric component is disposed in the hub body.

With the hub assembly according to the fourth aspect, it is possible to more reliably protect the parts of the electric component by disposing it in the hub body.

In accordance with a fifth aspect of the present disclosure, the hub assembly according to any one of the first aspect to the fourth aspect is configured so that the user input device is spaced from in an axial direction with respect to the electric component.

With the hub assembly according to the fifth aspect, it is possible to remotely locate the user input device from the electric component in a more convenient location to operate the user input device.

In accordance with a sixth aspect of the present disclosure, the hub assembly according to any one of the first aspect to the fifth aspect is configured so that the user input device does not include a wireless communication receiver.

With the hub assembly according to the sixth aspect, the manufacturing costs of the hub assembly can be reduced by not providing a wireless communication receiver to the user input device.

In accordance with a seventh aspect of the present disclosure, the hub assembly according to any one of the first aspect to the sixth aspect is configured so that the hub axle includes a cable receiving passageway axially extending between the electric component and the user input device.

With the hub assembly according to the seventh aspect, the electric component can be easily connected to the user input device without interfering with rotating parts by providing a cable in an axially extending cable receiving passageway of the hub axle.

In accordance with an eighth aspect of the present disclosure, the hub assembly according to any one of the first aspect to the seventh aspect further comprises a first bearing rotatably supporting a first end of the hub body on the hub axle and a second bearing rotatably supporting a second end of the hub body on the hub axle. The electric component is disposed between the first bearing and the second bearing. The user input device is disposed between the first bearing and an axial end of the hub axle.

With the hub assembly according to the eighth aspect, the hub body can rotate on the hub axle while the electric component and the user input device are provided in locations so that the electric component and the user input device do not rotate with the hub body. The user input device can also send a signal to an electrical component on the opposite side of the first bearing in the axial direction.

In accordance with a ninth aspect of the present disclosure, the hub assembly according to any one of the first aspect to the eighth aspect is configured so that the user input device is disposed outside of the hub body.

With the hub assembly according to the ninth aspect, the user input device can be easily operated by a user without disassembling the hub assembly.

In accordance with a tenth aspect of the present disclosure, the hub assembly according to any one of the first aspect to the eighth aspect configured so that the user input device is disposed inside of the hub body.

With the hub assembly according to the tenth aspect, the user input device can be reliably protected.

In accordance with an eleventh aspect of the present disclosure, the hub assembly according to any one of the first aspect to the ninth aspect further comprises a sprocket support body rotatably disposed around the rotational center axis to transmit a driving force to the hub body while rotating in a driving rotational direction around the rotational center axis.

With the hub assembly according to the eleventh aspect, the sprocket support body functions as freewheel to allow the sprocket support body to stop rotating during coasting.

In accordance with a twelfth aspect of the present disclosure, the hub assembly according to the eleventh aspect is configured so that the user input device is disposed inside of the sprocket support body.

With the hub assembly according to the twelfth aspect, the user input device can be reliably protected.

In accordance with a thirteenth aspect of the present disclosure, the hub assembly according to any one of the first aspect to the twelfth aspect further comprises an end cap disposed on an axial end of the hub axle. The user input device is operably accessible through an opening in the end cap.

With the hub assembly according to the thirteenth aspect, the user input device can be reliably protected while still being accessible without disassembling the hub assembly.

In accordance with a fourteenth aspect of the present disclosure, the hub assembly according to the thirteenth aspect is configured so that the end cap includes a rotation restriction part configured to couple the hub axle to a vehicle body of the human-powered vehicle so that rotation of the hub axle relative to the vehicle body is restricted.

With the hub assembly according to the fourteenth aspect, the hub assembly can be easily installed in the appropriate orientation.

In accordance with a fifteenth aspect of the present disclosure, the hub assembly according to any one of the first aspect to the fourteenth aspect further comprises a double nut including a first nut having a first tool engaging structure and a second nut having a second tool engaging structure. The first nut and the second nut are threadedly engaged with an external thread of the hub axle. The first tool engaging structure and the second tool engaging structure face outward in an axial direction. The first tool engaging structure is disposed radially outward of the second tool engaging structure with respect to the rotational center axis when viewed from the axial direction.

With the hub assembly according to the fifteenth aspect, the double nut can be tightened even when a component such as the user input device is placed between an axial end of the hub axle and the double nut.

In accordance with a sixteenth aspect of the present disclosure, the hub assembly according to the fifteenth aspect is configured so that the user input device is located on an axial outward side of the double nut with respect to the rotational center axis, and at least partly aligned with the double nut in the axial direction.

With the hub assembly according to the sixteenth aspect, the user input device is conveniently located for a user to operate.

In accordance with a seventeenth aspect of the present disclosure, the hub assembly according to the fifteenth aspect or the sixteenth aspect is configured so that the first tool engaging structure and the second tool engaging structure are accessible with a tool in the axial direction.

With the hub assembly according to the seventeenth aspect, the first nut and the second nut can be easily tightened where a component such as the user input device is placed between an axial end of the hub axle and the double nut.

In accordance with an eighteenth aspect of the present disclosure, the hub assembly according to the any one of the fifteenth aspect to the seventeenth aspect further comprises a first bearing and a second bearing. The first bearing rotatably supports a first end of the hub body on the hub axle. The second bearing rotatably supports a second end of the hub body on the hub axle. The first nut includes an inner race that supports a plurality of rolling elements of the first bearing.

With the hub assembly according to the eighteenth aspect, the hub body can rotate on the hub axle, while the number of parts can be reduced by the first nut including the inner race of the first bearing.

In accordance with a nineteenth aspect of the present disclosure, the hub assembly according to any one of the first aspect to the eighteenth aspect further comprises an electric power generator provided to the hub body, and configured to generate electric power by rotation of the hub body.

With the hub assembly according to the nineteenth aspect, it is possible to generate electric power from rotation of the hub body.

In accordance with a twentieth aspect of the present disclosure, the hub assembly according to the nineteenth aspect is configured so that the electric component includes at least one capacitor electrically connected to the electric power generator.

With the hub assembly according to the twentieth aspect, it is possible to provide power to the electric component while the human-powered vehicle is stopped.

In accordance with a twenty-first aspect of the present disclosure, a hub assembly is provided for a human-powered vehicle. The hub assembly basically comprises a hub axle, a rotating body and a double nut. The rotating body is rotatably mounted on the hub axle to rotate around a rotational center axis of the hub assembly. The double nut includes a first nut having a first tool engaging structure and a second nut having a second tool engaging structure. The first nut and the second nut are threadedly engaged with an external thread of the hub axle. The first tool engaging structure and the second engaging structure face outward in an axial direction with respect to the rotational center axis. The first tool engaging structure is disposed radially outward of the second tool engaging structure with respect to the rotational center axis when viewed from the axial direction.

With the hub assembly according to the twenty-first aspect, the first nut and the second nut can be easily tightened simultaneously of independently where both the first nut and the second nut are threadedly engaged with an external thread of the hub axle.

In accordance with a twenty-second aspect of the present disclosure, the hub assembly according to the twenty-first further comprises an electric component located adjacent an axial end of the hub axle on an axial outward side of the double nut with respect to the rotational center axis.

With the hub assembly according to the twenty-second aspect, the electric component is conveniently located such that the electric component can be accessed without loosening the first nut and/or the second nut.

In accordance with a twenty-third aspect of the present disclosure, the hub assembly according to the twenty-second aspect is further comprises a detected part and a rotation detection sensor. The detected part is disposed on the rotating body. The rotation detection sensor configured to detect the detected part. The electric component is disposed on the hub axle and includes the rotation detection sensor.

With the hub assembly according to the twenty-third aspect, it is possible to reliable detect rotation of the rotating body.

In accordance with a twenty-fourth aspect of the present disclosure, the hub assembly according to any one of the twenty-first aspect to the twenty-third aspect further comprises a first bearing and a second bearing. The first bearing rotatably supports a first end of the rotating body on the hub axle. The second bearing rotatably supports a second end of the rotating body on the hub axle. The first nut includes an inner race of the first bearing.

With the hub assembly according to the twenty-fourth aspect, the rotating body can rotate on the hub axle, while the number of parts can be reduced by the first nut including the inner race of the first bearing.

In accordance with a twenty-fifth aspect of the present disclosure, the hub assembly according to any one of the twenty-first aspect to the twenty-fourth aspect is configured so that the first nut and the second nut are disposed inside of the rotating body.

With the hub assembly according to the twenty-fifth aspect, the hub assembly can be made more compact in the axial direction.

Also, other objects, features, aspects and advantages of the disclosed hub assembly will become apparent to those skilled in the art from the following detailed description, which, taken in conjunction with the annexed drawings, discloses preferred embodiments of the hub assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
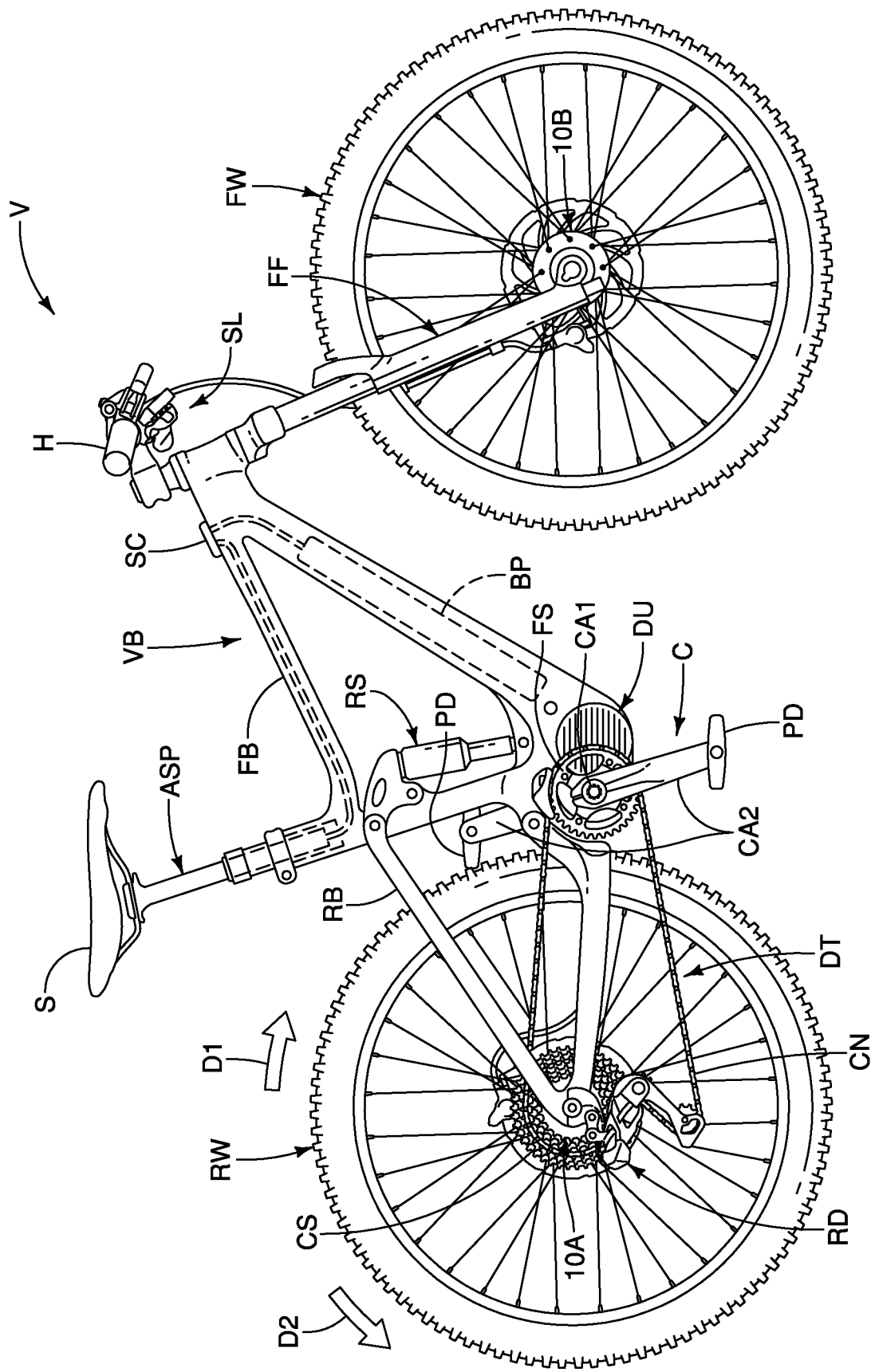
FIG. 1 is a side elevational view of a human-powered vehicle (i.e., bicycle) equipped with a hub assembly (i.e., a bicycle hub assembly) in accordance with a first embodiment.

Referring initially to FIG. 1, a hub assembly 10A is provided for a human-powered vehicle V. In other words, the human-powered vehicle V (i.e., a bicycle) is illustrated that is equipped with the hub assembly 10A in accordance with an illustrated embodiment. Here, in the illustrated embodiment, the hub assembly 10A is a bicycle hub or a bicycle hub assembly. More specifically, the hub assembly 10A is a bicycle rear hub or a bicycle rear hub assembly. Also, here, in the illustrated embodiment, the hub assembly 10A is a hub dynamo for providing electric power to one or more components of the human-powered vehicle V. However, the hub assembly 10A is not limited to a hub dynamo. In particular, certain aspects of the hub assembly 10A can be provided that does not generate electric power. Also, while the hub assembly 10A is illustrated as a rear hub assembly, certain aspects of the hub assembly 10A can be provided to a hub assembly 10B that is a front hub assembly. Thus, the hub assembly 10A is not limited to a rear hub assembly.

Here, the human-powered vehicle V is an electric assist bicycle (E-bike). Alternatively, the human-powered vehicle V can be a road bicycle, a city bike, a cargo bike, and a recumbent bike, or another type of off-road bicycle such as a cyclocross bicycle. As seen in FIG. 1, the human-powered vehicle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The human-powered vehicle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the human-powered vehicle V in a conventional manner. The electric drive unit DU is actuated, for example, in accordance with a human driving force applied to the pedals PD. The electric drive unit DU is actuated by electric power supplied from a main battery pack BP that is mounted on a downtube of the human-powered vehicle V. The main battery pack BP can provide electrical power to other vehicle components such as the rear derailleur RD, the height adjustable seatpost ASP, the rear shock absorber RS, the front fork FF and any other vehicle component that uses electrical power.

The human-powered vehicle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the human-powered vehicle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the human-powered vehicle V.

Here, the human-powered vehicle V further includes a rear derailleur RD that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device). Here, the rear derailleur RD is provided on the rear side of the rear frame body RB near the hub assembly 10A. The rear derailleur RD can be operated when a rider of the human-powered vehicle V manually operates a gear shift operating device or shifter SL. The rear derailleur RD can also be automatically operated based on traveling conditions and/or operating conditions of the human-powered vehicle V. The human-powered vehicle V can further include a plurality of electronic components. Some or all of the electronic components can be supplied with electric power generated by the hub assembly 10A during a power generation state as discussed herein.

The structure of the hub assembly 10A will now be described with particular reference to FIGS. 2 to 5. The hub assembly 10A basically comprises a hub axle 12 and a hub body 14. The hub axle 12 is configured to be non-rotatably attached to the vehicle body VB. In this embodiment, the hub axle 12 is configured to be non-rotatably attached to the rear frame body RB. The hub body 14 is rotatably mounted on the hub axle 12 to rotate around a rotational center axis A1 of the hub assembly 10A. The hub body 14 is one example of a rotating body that is rotatably mounted on the hub axle 12 to rotate around the rotational center axis A1 of the hub assembly 10A. The hub axle 12 has a center axis coaxial with the rotational center axis A1. The hub body 14 is rotatably disposed around the rotational center axis A1. In other words, the hub body 14 is rotatably mounted around the hub axle 12. The hub axle 12 is a rigid member made of a suitable material such as a metallic material.

Figure 5:
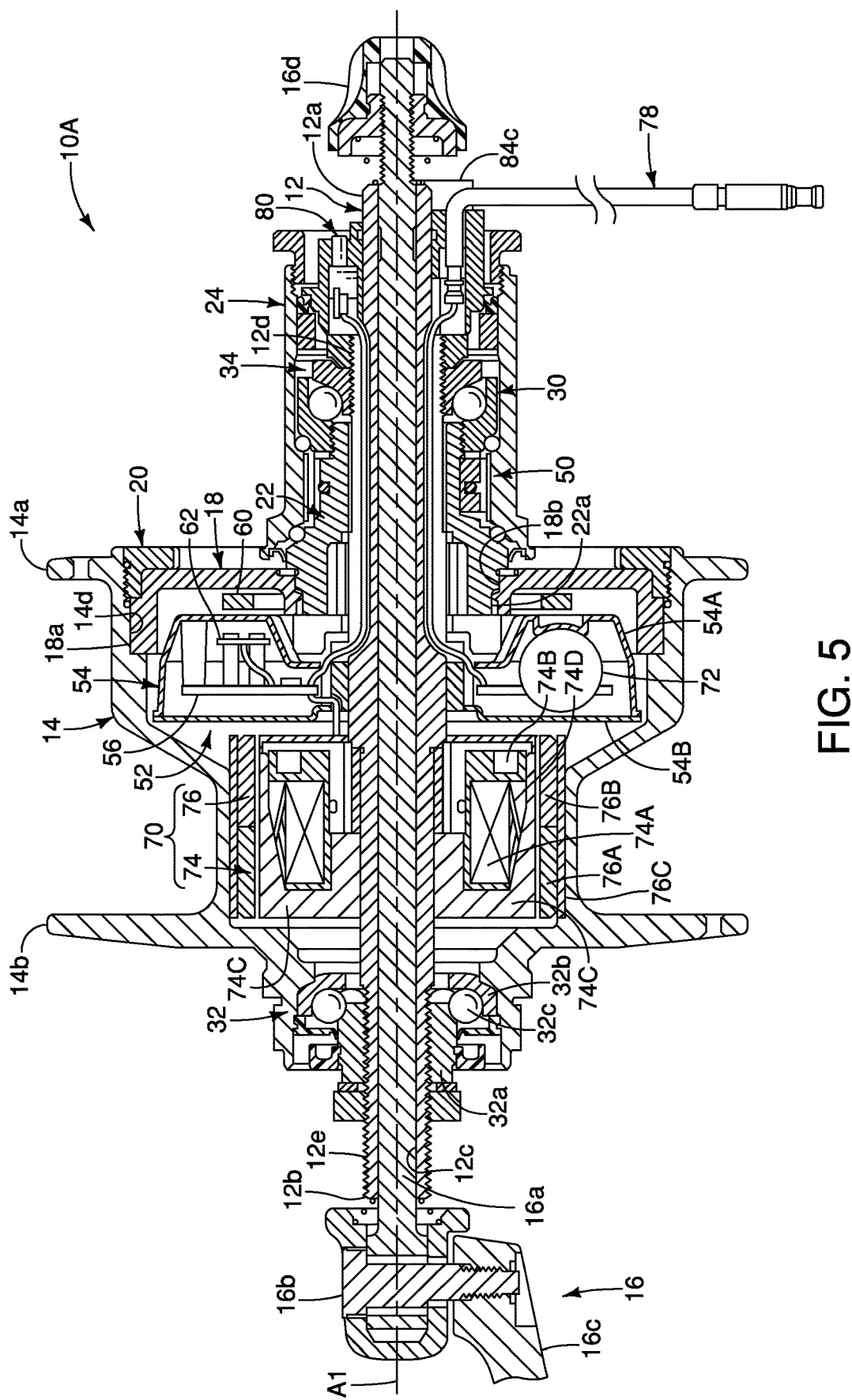
FIG. 5 is a longitudinal cross-sectional view of the hub assembly illustrated in FIGS. 2 to 4 as seen along section line 5-5 in FIG. 4.

As seen in FIG. 5, the hub axle 12 has a first axial end 12a and a second axial end 12b. Here, the hub axle 12 is a tubular member. Thus, the hub axle 12 has an axial bore 12c that extends between the first axial end 12a and the second axial end 12b. The hub axle 12 can be a one-piece member or made of several pieces.

Figure 2:
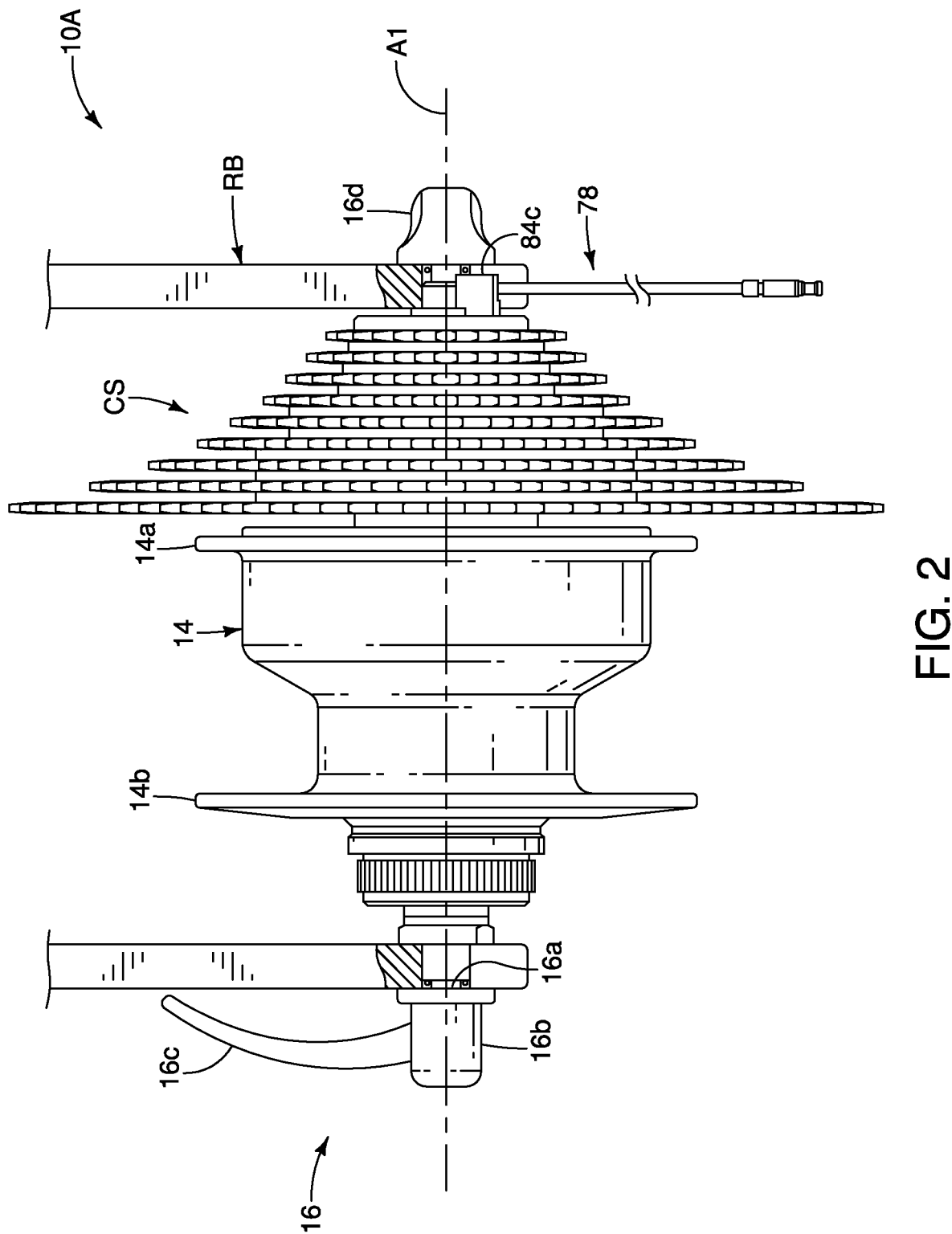
FIG. 2 is a longitudinal elevational view of the hub assembly attached to the vehicle body of the human-powered vehicle illustrated in FIG. 1.

Here, as seen in FIGS. 2 and 5, the hub assembly 10A further comprises a wheel holding mechanism 16 for securing the hub axle 12 of the hub assembly 10A to the rear frame body RB. The wheel holding mechanism 16 basically includes a shaft or skewer 16a, a cam body 16b, a cam lever 16c and an adjusting nut 16d. The cam lever 16c is attached to one end of the skewer 16a via the cam body 16b, while the adjusting nut 16d is threaded on the other end of the skewer 16a. The cam lever 16c is attached to the cam body 16b. The cam body 16b is coupled between the skewer 16a and the cam lever 16c to move the skewer 16a relative to the cam body 16b. Thus, the cam lever 16c is operated to move the skewer 16a in the axial direction of the rotational center axis A1 with respect to the cam body 16b to change the distance between the cam body 16b and the adjusting nut 16d. Preferably, a compression spring is provided at each end of the skewer 16a. The wheel holding mechanism 16 is sometimes called a quick release skewer. The wheel holding mechanism 16 is typically used with a frame having a pair of U-shaped axle attachments that each have an open-ended slot for receiving a portion of the skewer 16a. Alternatively, the hub axle 12 can be non-rotatably attached to the rear frame body RB with other attachment structures as needed and/or desired.

Figure 3:
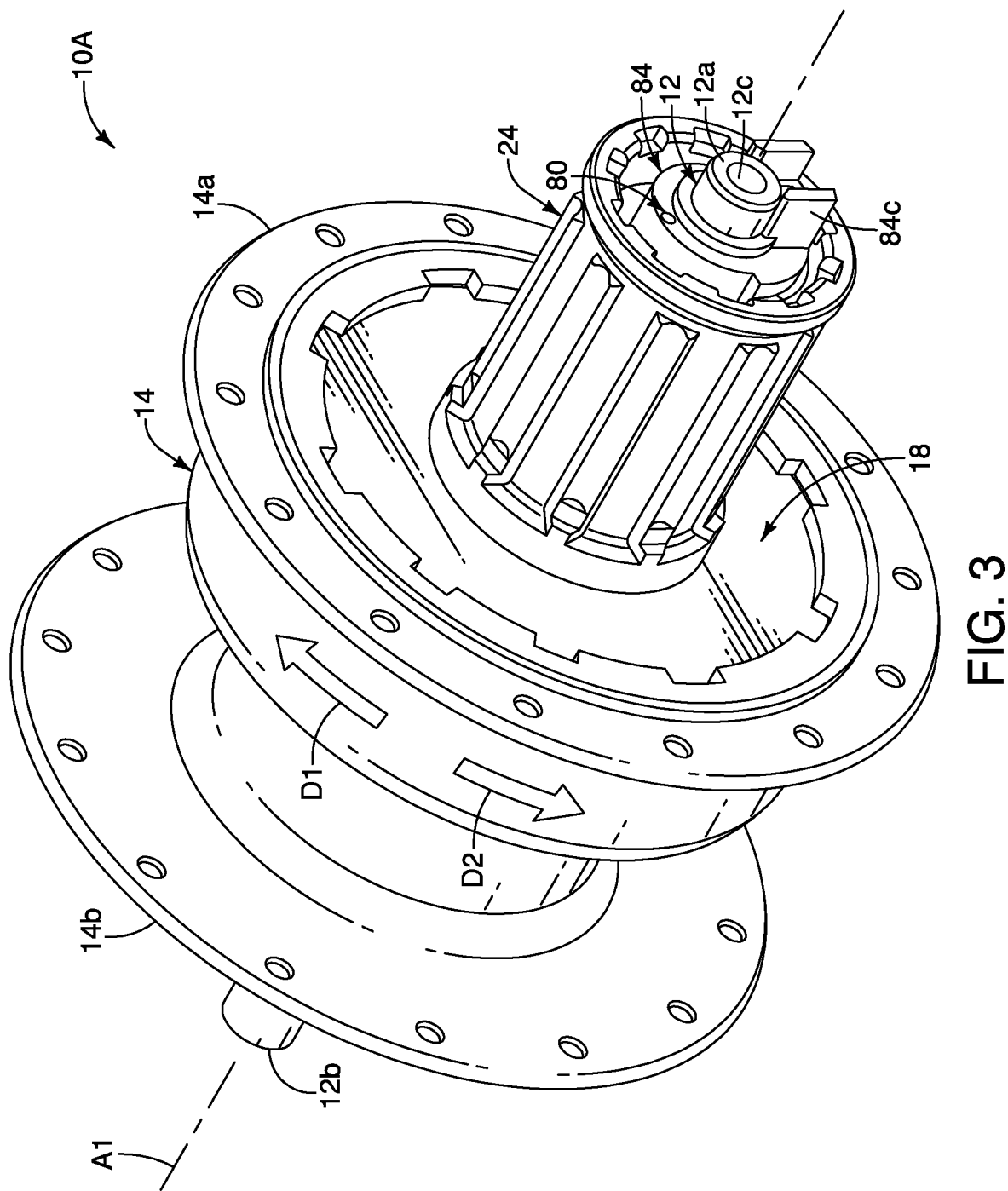
FIG. 3 is a perspective view of the hub assembly illustrated in FIG. 1.
Figure 4:
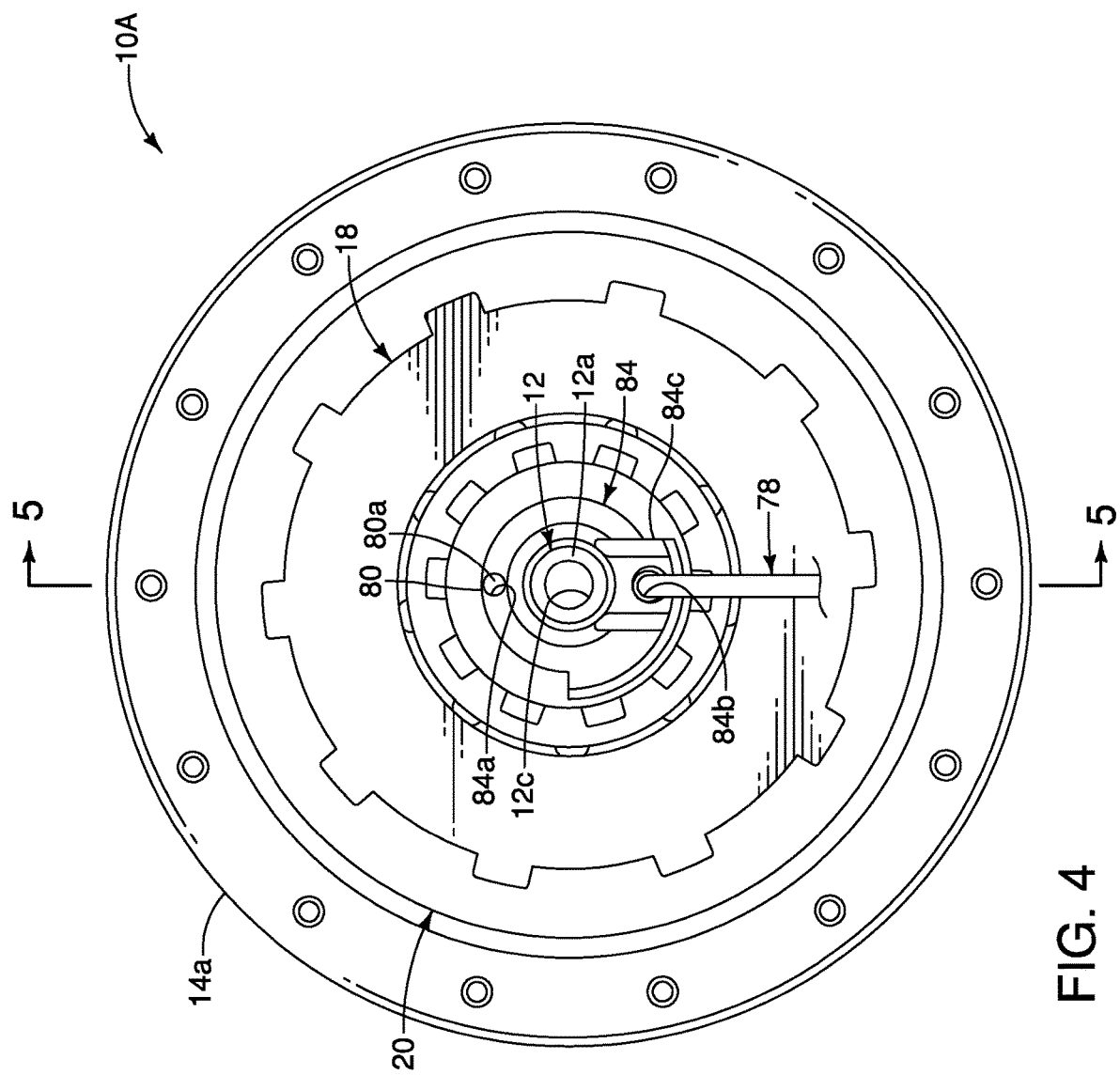
FIG. 4 is an end elevational view of the hub assembly illustrated in FIGS. 2 to 3.

As indicated in FIGS. 1, 3 and 4, the hub body 14 is rotatably mounted around the hub axle 12 to rotate in a driving rotational direction D1. The hub body 14 a rigid member made of a suitable material such as a metallic material or reinforced plastic material. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the rotational center axis A1 from a peripheral surface of the hub body 14.

The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

As seen in FIG. 5, the hub body 14 has a large opening 14c that receives an end wall 18 and a locking ring 20. The end wall 18 is non-rotatably engaged with the hub body 14. Here, for example, the end wall 18 has a splined outer peripheral surface 18a that engages a splined inner surface 14d of the hub body 14. The end wall 18 is retained to the hub body 14 by the locking ring 20. Here, for example, the locking ring 20 is threaded into the hub body 14. The end wall 18 has a splined inner peripheral surface 18b that is splined engaged with an inner support body 22. Specifically, the inner support body 22 has an outer splined portion 22a that is splined engaged with the splined inner peripheral surface 18b to non-rotatably couple the inner support body 22 to the end wall 18. Thus, the hub body 14, the end wall 18, the locking ring 20 and the inner support body 22 rotate together as a unit around the hub axle 12.

Here, the hub assembly 10A further comprises a sprocket support body 24 rotatably disposed around the rotational center axis A1 to transmit a driving force to the hub body 14 while rotating in the driving rotational direction D1 around the rotational center axis A1. The sprocket support body 24 is another example of a rotating body that is rotatably mounted on the hub axle 12 to rotate around the rotational center axis A1 of the hub assembly 10A. Thus, broadly speaking, the hub assembly 10A comprises the hub axle 12 and a rotating body (e.g., the hub body 14 or the sprocket support body 24). The rotating body (e.g., the hub body 14 and/or the sprocket support body 24) is rotatably mounted on the hub axle 12 to rotate around the rotational center axis A1 of the hub assembly 10A. The sprocket support body 24 is a rigid member made of a suitable material such as a metallic material.

In the illustrated embodiment, the sprocket support body 24 supports the rear sprockets CS as seen in FIG. 2. The sprocket support body 24 is rotatably disposed around the rotational center axis A1 to transmit a driving force to the hub body 14 while rotating in a driving rotational direction around the rotational center axis A1. As explained below, the sprocket support body 24 does not transmit a driving force to the hub body 14 while rotating in a non-driving rotational direction D2 around the rotational center axis A1. The non-driving rotational direction D2 is opposite to the driving rotational direction D1 with respect to the rotational center axis A1. The rotational center axis of the sprocket support body 24 is disposed concentrically with the rotational center axis A1 of the hub assembly 10A.

While the sprocket support body 24 is configured to non-rotatably support the rear sprockets CS, the sprocket support body 24 is not limited to the illustrated embodiment. Alternatively, one or more of the rear sprockets CS can be integrally formed with the sprocket support body 24. In any case, the sprocket support body 24 and the rear sprockets CS are coupled together to rotate together in both the driving rotational direction D1 and the non-driving rotational direction D2.

As seen FIG. 5, the hub assembly 10A further comprises a first bearing 30 and a second bearing 32. The first bearing 30 rotatably supports a first end of the hub body 14 on the hub axle 12. In particular, the first bearing 30 rotatably supports the inner support body 22 which is fixedly couped to the first end of the hub body 14 via the end wall 18. The second bearing 32 rotatably supporting a second end of the hub body 14 on the hub axle 12. Here, the first bearing 30 also rotatably supports the sprocket support body 24 on the hub axle 12. Thus, broadly speaking, the first bearing 30 rotatably supports a first end of a rotating body (e.g., the hub body 14 and/or the sprocket support body 24) on the hub axle 12 and the second bearing 32 rotatably supports a second end of the rotating body (e.g., the hub body 14 and/or the sprocket support body 24) on the hub axle 12.

Here, the hub assembly 10A further comprises a double nut 34. The double nut 34 is threaded onto the hub axle 12. Thus, the double nut 34 limits axial movement of the hub body 14, the sprocket support body 24 and other parts of the hub assembly 10A in the axial direction towards the first axial end 12a of the hub axle 12. The double nut 34 includes a first nut 36 and a second nut 38. Preferably, the first nut 36 and the second nut 38 are disposed inside of the rotating body (e.g., the hub body 14 and/or the sprocket support body 24). Here, the first nut 36 and the second nut 38 are disposed inside of the sprocket support body 24 (i.e., one the rotating bodies).

In the illustrated embodiment, the first nut 36 is a part of the first bearing 30. In particular, the first nut 36 includes an inner race of the first bearing 30. More specifically, the first bearing 30 includes an inner race 30a (the first nut 36), an outer race 30b and a plurality of rolling elements 30c. The inner race 30a (the first nut 36) has an internal thread 30a1 that is threadedly engaged to a first external thread 12d of the hub axle 12. The outer race 30b has an internal thread 30b1 that is threadedly engaged to an external thread 22b of the inner support body 22. The roller elements 30c are disposed between the inner race 30a and the outer race 30b. The inner race 30a (the first nut 36) supports the plurality of rolling elements 30c of the first bearing 30. In particular, the first nut 36 has a bearing surface 36a that supports the plurality of rolling elements 30c of the first bearing 30. The axial force on the roller elements 30c can be adjusted by changing the position of the inner race 30a on the hub axle 12. The second nut 38 has an internal thread 38a that is threadedly engaged to the first external thread 12d of the hub axle 12.

The second bearing 32 includes an inner race 32a, an outer race 32b and a plurality of roller elements 32c. The inner race 32a is threadedly engaged to a second thread 12e of the hub axle 12. The roller elements 32c are disposed between the inner race 32a and the outer race 32b. The inner race 32a supports the plurality of rolling elements 32c of the second bearing 32. The axial force on the roller elements 30c can be adjusted by changing the position of the inner race 30a on the hub axle 12.

The first bearing 30 and the second bearing 32 are angular contact ball bearings. Angular contact ball bearings have inner and outer ring raceways that are displaced relative to each other in the direction of the bearing axis. In other words, angular contact bearings are designed to accommodate combined loads, i.e., simultaneously acting radial and axial loads. Further, angular contact roller bearings (i.e., tapered roller bearing) can be adopted instead of the angular contact ball bearings for the first bearing 30 and the second bearing 32. Angular contact roller bearings include cylindrical roller bearings and needle roller bearings.

The first nut 36 has a first tool engaging structure 36b. The second nut 38 has a second tool engaging structure 38b. The first nut 36 and the second nut 38 are threadedly engaged with the external thread 12d of the hub axle 12. The first tool engaging structure 36b and the second tool engaging structure 38b face outward in an axial direction with respect to the rotational center axis A1. The first tool engaging structure 36b is disposed radially outward of the second tool engaging structure 38b with respect to the rotational center axis A1 when viewed from the axial direction.

Figure 9:
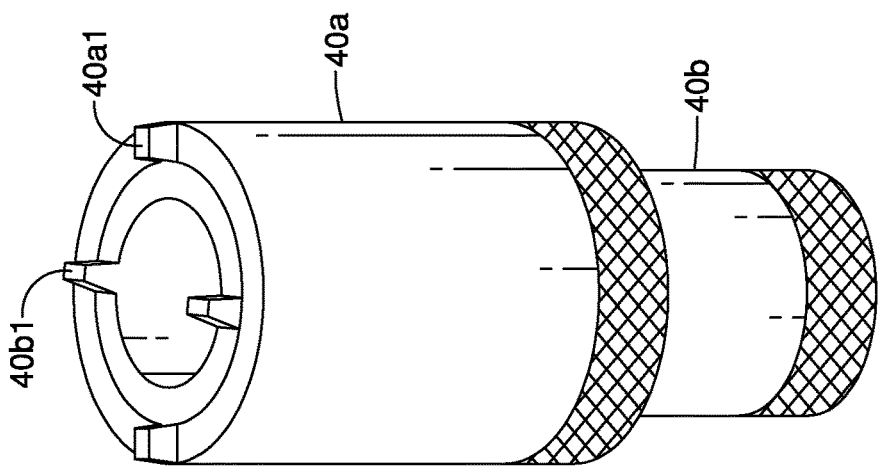
FIG. 9 is a perspective view of tool for installing the double nut to the hub axle of the hub assembly illustrated in FIGS. 2 to 5.
Figure 8:
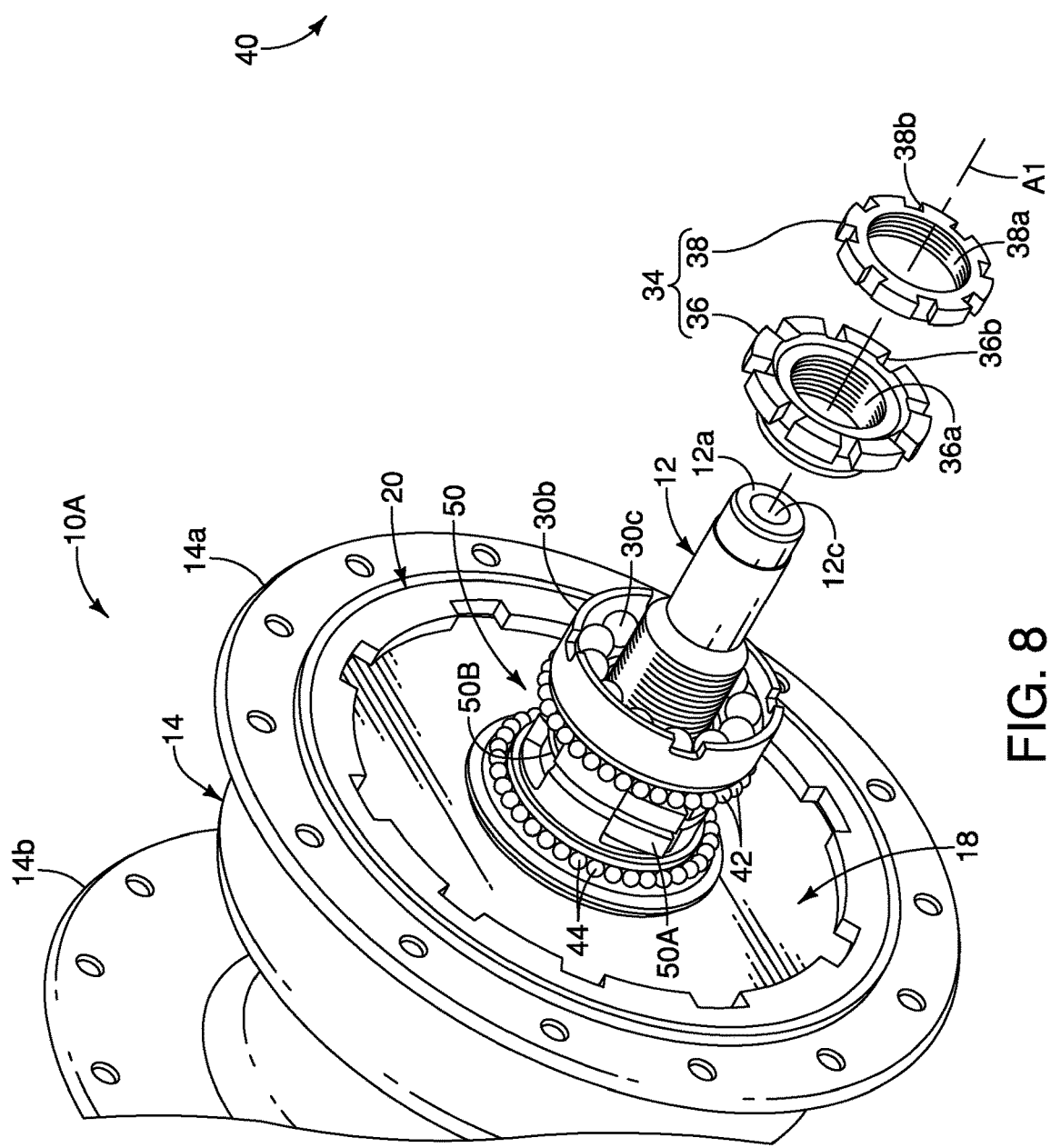
FIG. 8 is a partial exploded perspective view, similar to FIG. 7, of the hub assembly illustrated in FIGS. 2 to 5, but in which the double nut is unthread from the hub axle of the hub assembly.

The first tool engaging structure 36b and the second tool engaging structure 38b are accessible with a tool 40 (see FIG. 9) in the axial direction. As seen in FIG. 9, the tool 40 has a first tool cylinder 40a and a second tool cylinder 40b. The second tool cylinder 40b is rotatably disposed inside the first tool cylinder 40a. The first tool cylinder 40a and the second tool cylinder 40b can be rotated independently or together. The first tool cylinder 40a includes a first nut engaging structure 40a1 that is configured to engage the first tool engaging structure 36b of the first nut 36. The second tool cylinder 40b includes a second nut engaging structure 40b1 that is configured to engage the second tool engaging structure 38b of the second nut 38. Of course, other types of tools can be used as needed and/or desired.

The hub assembly 10A further comprises a plurality of first rolling elements 42 and a plurality of second rolling elements 44. The first rolling elements 42 and the second rolling elements 44 rotatably supports the sprocket support body 24. The first rolling elements 42 are disposed between the outer race 30b and the sprocket support body 24. In particular, the outer race 30b has an inner race surface 42a and the sprocket support body 24 has an outer race surface 42b. The first rolling elements 42 are disposed between the inner race surface 42a and the outer race surface 42b to form a first sprocket support body bearing 46. The second rolling elements 44 are disposed between the inner support body 22 and the sprocket support body 24. In particular, the inner support body 22 has an inner race surface 44a and the sprocket support body 24 has an outer race surface 44b. The second rolling elements 44 are disposed between the inner race surface 44a and the outer race surface 44b to form a second sprocket support body bearing 48.

The first sprocket support body bearing 46 and the second sprocket support body bearing 48 are angular contact ball bearings. Further, angular contact roller bearings (i.e., tapered roller bearing) can be adopted instead of the angular contact ball bearings for the first sprocket support body bearing 46 and/or the second sprocket support body bearing 48.

Figure 6:
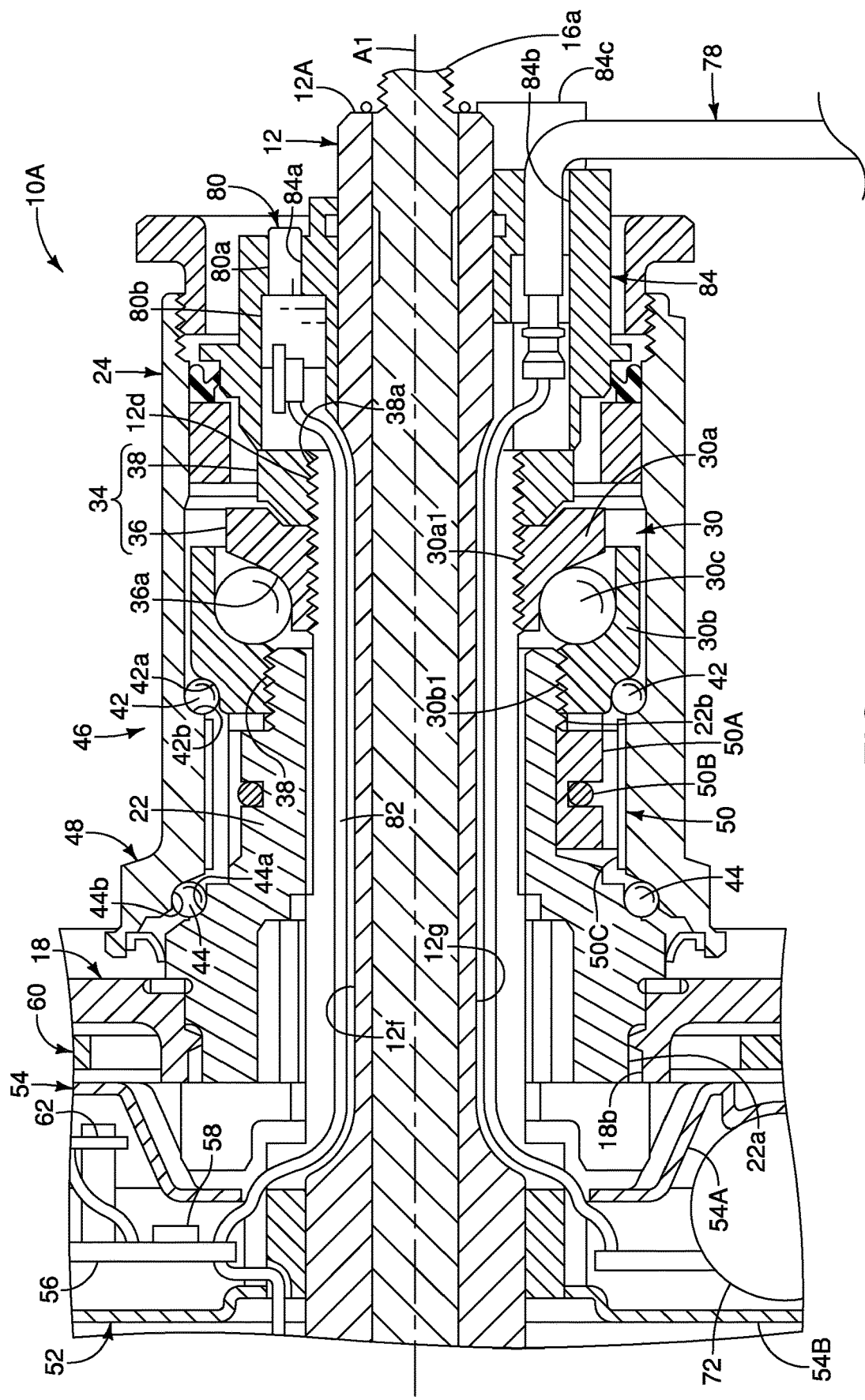
FIG. 6 is an enlarged longitudinal cross-sectional view of a portion of the hub assembly illustrated in FIG. 5.
Figure 7:
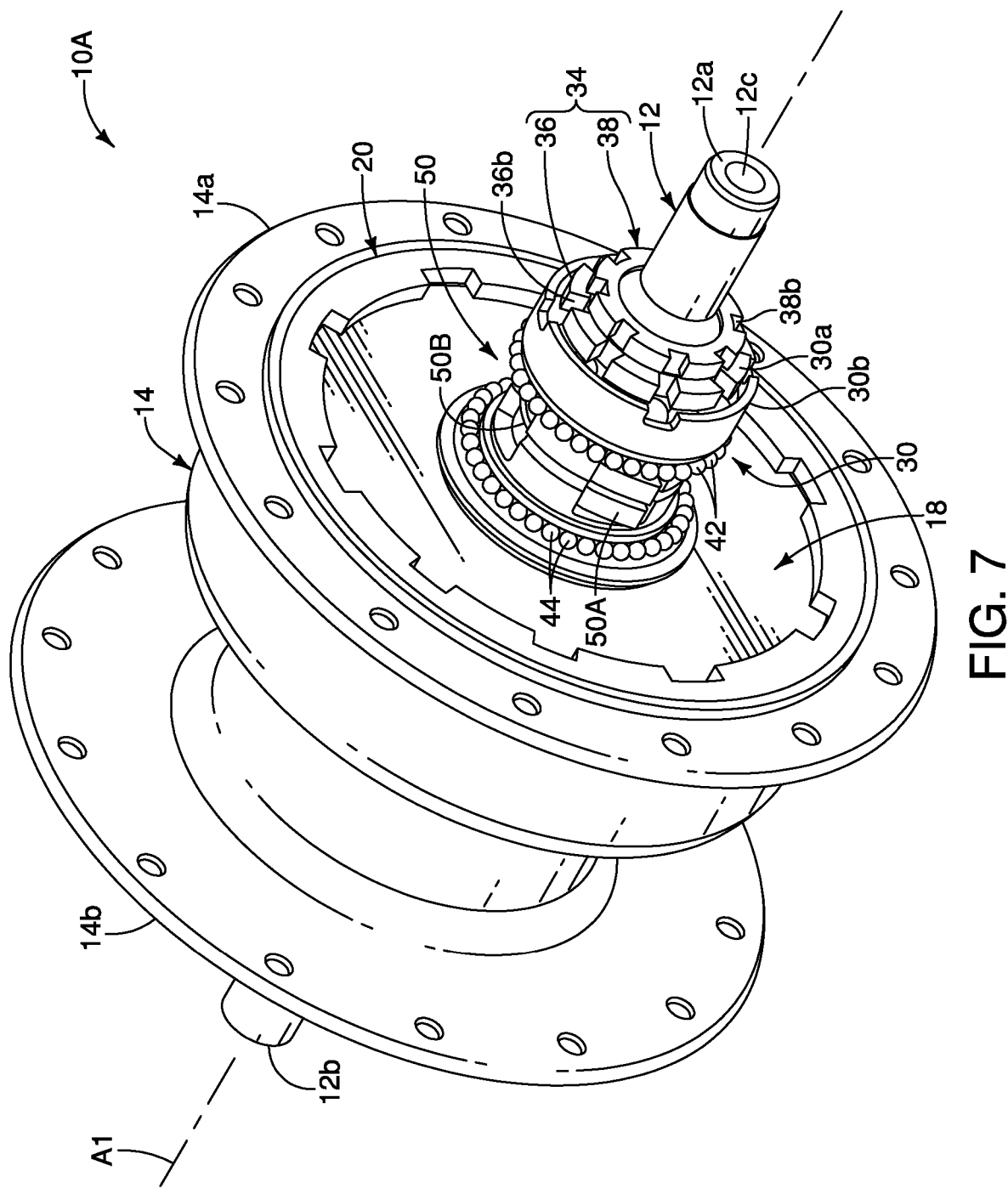
FIG. 7 is a perspective view of the hub assembly illustrated in FIGS. 2 to 5, in which selected parts have been removed to show a double nut installed to a hub axle of the hub assembly.

As seen in FIG. 6, the hub assembly 10A further comprises a one-way clutch 50 that is formed between the hub body 14 and the sprocket support body 24. The one-way clutch 50 includes a plurality of pawls 50A disposed between the hub body 14 and the sprocket support body 24. The one-way clutch 50 further includes a biasing element 50B that couples the pawls 50A to the sprocket support body 24. The one-way clutch 50 further includes a plurality of ratchet teeth 50C. Here, the ratchet teeth 50C are provided on the internal surface of the sprocket support body 24. The biasing element 50B biases the pawls 50A into engagement with the ratchet teeth 50C. The biasing element 50B squeezes the pawls 50A against the sprocket support body 24 such that the pawls 50A pivot towards engagement with the ratchet teeth 50C.

In this way, the sprocket support body 24 is coupled to the hub body 14 to rotate together in the driving rotational direction D1 around the rotational center axis A1. Also, in a case where the sprocket support body 24 is rotated in the non-driving rotational direction D2, the ratchet teeth 50C of the sprocket support body 24 push the pawls 50A and pivot the pawls 50A to a retracted position against the sprocket support body 24. Thus, the sprocket support body 24 is configured to rotate relative to the hub body 14 in the non-driving rotational direction D2 around the rotational center axis A1. In this way, the sprocket support body 24 and the one-way clutch 50 form a freewheel that is commonly used in bicycles. Since the basic operation of the freewheel is relatively conventional, the freewheel will not be discussed or illustrated in further detail.

As seen in FIG. 5, the hub assembly 10A comprises an electric component 52. The electric component 52 is disposed on the hub axle 12. In particular, the electric component 52 is non-rotatably disposed on the hub axle 12. Thus, the electric component 52 is non-rotatably disposed with respect to the rotational center axis A1. In the illustrated embodiment, the electric component 52 is disposed between the first bearing 30 and the second bearing 32. Preferably, the electric component 52 is disposed in the hub body 14.

Here, the electric component 52 includes a housing 54 that is non-rotatably disposed on the hub axle 12. For example, in the illustrated embodiment, the housing 54 is keyed to the hub axle 12 to prevent the housing 54 from rotating relative to the hub axle 12. Basically, the housing 54 includes a housing body 54A and a lid 54B. Here, the lid 54B is bonded to the housing body 54A by adhesive or welding. However, the lid 54B can be attached to the housing body 54A by threaded fastener, rivets, etc. Preferably, the housing body 54A and the lid 54B are rigid members made from a suitable material. For example, the housing body 54A and the lid 54B are made of a resin material. For example, the housing body 54A and the lid 54B can each be injection molded members.

Also, the electric component 52 includes an electric circuit board 56. The electric circuit board 56 is disposed in the housing 54. In particular, the electric circuit board 56 is attached to the housing body 54A. In this way, the electric circuit board 56 is non-rotatable with respect to the hub axle 12. The electric circuit board 56 is disposed perpendicular to the rotational center axis A1. The lid 54B is attached to the housing body 54A for enclosing the electric circuit board 56 in the housing 54.

The electric circuit board 56 further includes an electronic controller 58 that is provided on the electric circuit board 56. The electronic controller 58 includes at least one processor that executes predetermined control programs. The at least one processor can be, for example, a central processing unit (CPU) or a micro processing unit (MPU). The term "electronic controller" as used herein refers to hardware that executes a software program, and does not include a human. Preferably, the electric circuit board 56 further includes a data storage device (memory) that provided on the electric circuit board 56. The data storage device (memory) stores various control programs and information used for various control processes including power generation control, power storage control, hub rotation detection control, etc. The data storage device includes any computer storage device or any non-transitory computer-readable medium with the sole exception of a transitory, propagating signal. For example, the data storage device includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

As seen in FIG. 5, the hub assembly 10A further comprises a detected part 60 and a rotation detection sensor 62. The rotation detection sensor 62 is configured to detect the detected part 60. The detected part 60 is disposed on a rotating body. Here, the detected part 60 is disposed on the end wall 18 of the hub body 14. On the other hand, the rotation detection sensor 62 is provided to the housing 54.

Here, the rotation detection sensor 62 disposed at a position separated from the electric circuit board 56. In particular, the rotation detection sensor 62 is arranged at a position separated from the electric circuit board 56 in a direction parallel to the rotational center axis A1. Thus, the rotation detection sensor 62 is non-rotatably disposed on the hub axle 12. Also, the rotation detection sensor 62 can be placed near the detected part 60. In other words, the rotation detection sensor 62 does not rotate with the hub body 14. With this arrangement, the electric component 52 includes the rotation detection sensor 62. The rotation detection sensor 62 is electrically connected to the electronic controller 58 via the electric circuit board 56. The electronic controller 58 is configured to receive a detection signal from the rotation detection sensor 62. Thus, the electronic controller 58 can determine information with respect to the rotation of the hub body 14 on the hub axle 12.

In the illustrated embodiment, the rotation detection sensor 62 includes a magnetic sensor, and the detected part 60 includes a magnet. Thus, the magnetic sensor detects movement of the magnet, which rotates together with the hub body 14. In other words, with this arrangement, the rotation detection sensor 62 is configured to detect the detected part 60 to detect rotation of the hub body 14 around the rotational center axis A1. The electronic controller 58 is configured to receive a detection signal from the rotation detection sensor 62.

Here, the magnet of the detected part 60 is an annular member with alternating S-pole sections and N-pole sections. The detected part 60 is fixed to the end wall 18 of the hub body 14. In this way, the rotation detection sensor 62 can detect a rotational amount and a rotational direction of the hub body 14. However, the detected part 60 is not limited to the illustrated annular member. For example, the detected part 60 can be formed of a single non-annular magnet, or two or more magnets that are circumferentially spaced apart about the rotational center axis A1. In the case of using two or more circumferentially spaced magnets, a back yoke can be provided and the circumferentially spaced magnets can be provided to the back yoke. In this way, the circumferentially spaced magnets can be easily installed in the hub 10. The term "sensor" as used herein refers to a hardware device or instrument designed to detect the presence or absence of a particular event, object, substance, or a change in its environment, and to emit a signal in response. The term "sensor" as used herein do not include a human.

As seen in FIG. 5, the hub assembly 10A further comprises an electric power generator 70. The electric power generator 70 is configured to generate electric power by rotation of the hub body 14. Also, in the illustrated embodiment, the electric component 52 includes at least one capacitor 72 that is electrically connected to the electric power generator 70. Here, the electric component 52 comprises two capacitors 72. The capacitors 72 are examples of an electric power storage of the electric component 52. The capacitors 72 are preferably disposed in the housing 54 of the hub assembly 10A. Thus, the capacitors 72 are non-rotatably supported on the hub axle 12 by the housing 54. The electric circuit board 56 is electrically connected to the rotation detection sensor 62 and the capacitor 72. In this way, the capacitor 72 provides electrical power to the electric circuit board 56 and other electric components electrically connected to the electric circuit board 56. For example, the capacitor 72 provides electrical power to the rotation detection sensor 62. Also, the electronic controller 58 of the electric circuit board 56 is configured to control the input and output of electric power from the capacitor 72.

The electric power generator 70 is provided to the hub body 14. More specifically, the electric power generator 70 is provided to the hub body 14 between the hub axle 12 and a center portion of the hub body 14. In the illustrated embodiment, the hub body 14 is rotatably mounted on the axle 12 to rotate around the rotational center axis A1 of the electric power generator 70. The electric power generator 70 is configured to generate electric power by rotation of the hub body 14 relative to the hub axle 12. The electronic controller 58 of the electric circuit board 56 is electrically connected to the electric power generator 70 for controlling the electric power output of the electric power generator 70. Thus, the electric power generated by the electric power generator 70 can be stored and/or supplied directly to other components such as the rotation detection sensor 62, the rear derailleur RD, etc.

In the illustrated embodiment, the electric power generator 70 further includes a stator 74 and a rotor 76. The stator 74 is non-rotatable with respect to the hub axle 12. On the other hand, the rotor 76 is rotatably mounted on the hub axle 12 to rotate around a rotational center axis A1 of the electric power generator 70. In particular, the rotor 76 is provided to the hub body 14 so as to rotate with the hub body 14. Thus, when the hub body 14 rotates with respect to the hub axle 12, the rotor 76 rotates with respect to the stator 74 for power generation. Namely, an induced electromotive force is generated on the stator 74 by the rotation of the rotor 76 and an electrical current flow out of the stator 74 of the electric power generator 70.

As seen in FIG. 5, the stator 74 includes an armature that is disposed on the hub axle 12. The armature of the stator 74 includes a winding coil 74A and a bobbin 74B. The winding coil 74A is wound on the bobbin 74B for supporting the winding coil 74A. The bobbin 74B is non-rotatably coupled to the hub axle 12. The bobbin 74B has a cylindrical trunk portion, a first flange portion and a second flange portion. The cylindrical trunk portion has an outside circumference on which the winding coil 74A is wound. The first flange portion and the second flange portion are formed on both axial end portions of the cylindrical trunk portion. The winding coil 74A is made of a conductive metal wire material, such as a copper wire or an aluminum alloy wire. The winding coil 74A is electrically connected to the electric circuit board 56. In this way, electric power generated in the winding coil 74A is transmitted to the electric circuit board 56 of the electric component 52. The electric circuit board 56 then regulates the electric power received from the winding coil 74A to selectively store the electric power in the capacitors 72 and/or to selectively transmit the electric power outside of the hub assembly 10A via an electrical cable 78.

The electrical cable 78 is electrically connected the electric power generator 70 via the electric circuit board 56. In this way, the electrical cable 78 can provide electric power generated by the hub assembly 10A to the rear derailleur RD, the battery pack BP or another electric component. The electrical cable 78 can also be used to transmit signals from the electronic controller 58 of the electric circuit board 56 to the rear derailleur RD or another electric component using power line communication (PLC).

The armature of the stator 74 further includes a plurality of first yoke 74C and a plurality of second yoke 74D. The first yokes 74C are arranged in the circumferential direction of the hub axle 12. Likewise, the second yokes 74D are arranged in the circumferential direction of the hub axle 12 and alternate with the first yokes 74C. The winding coil 74A is located between the first yokes 74C and the second yokes 74D in the axial direction of the hub axle 12. Here, the first yokes 74C and the second yokes 74D are fitted to grooves of the bobbin 74B so that the first yokes 74C and the second yokes 74D alternate in a circumferential direction around the rotational center axis A1. The first yokes 74C and the second yokes 74D can be attached to the bobbin 74B by an adhesive, for example.

Each of the first yokes 74C can be a laminated yoke made up of a plurality of laminate pieces or can be a single piece. In the case of laminated yokes, the laminate pieces of the first yokes 74C are laminated together in the circumferential direction about the rotational center axis A1. The laminate pieces of the first yokes 74C are made of, for example, silicon steel sheets (more specifically, non-oriented silicon steel sheets) on the surface of which an oxide film has been formed. The laminate pieces of the first yokes 74C are examples of a plate-like member.

Likewise, the second yokes 74D can be a laminated yoke made up of a plurality of laminate pieces or can be a single piece. In the case of laminated yokes, the laminate pieces of the second yokes 74D are laminated together in the circumferential direction about the rotational center axis A1. The laminate pieces of the second yokes 74D are made of, for example, silicon steel sheets (more specifically, non-oriented silicon steel sheets) on the surface of which an oxide film has been formed. The laminate pieces of the second yokes 74D are examples of a plate-like member.

The rotor 76 includes at least one magnet. Here, in the illustrated embodiment, the rotor 76 includes a plurality of first magnet parts 76A and a plurality of second magnet parts 76B arranged inside a tubular support 76C. The tubular support 76C is fixedly coupled to the inside of the hub body 14 so that the magnet (rotor 76) and the hub body 14 rotate together around the hub axle 12. The tubular support 76C has the function of a back yoke. The back yoke is a member having a high magnetic permeability, which is arranged on the opposite side of the magnetized surface. By using the back yoke, a high generated magnetic field can be obtained. The tubular support 76C can be omitted. Alternatively, the hub body 14 can have the magnet (rotor 76) such that the hub body 14 partially forms the electric power generator 70. The first magnet parts 76A and the second magnet parts 76B are arranged so that S-poles and N-poles of the first magnet parts 76A and the second magnet parts 76B are alternately arranged in the circumferential direction of the hub axle 12. Therefore, the S-poles of the first magnet parts 76A are not aligned with the S-poles of the second magnet parts 76B, and the N-poles of the first magnet parts 76A are not aligned with the N-poles of the second magnet parts 76B in the axial direction of the hub axle 12.

As mentioned above, the winding coil 74A is illustrated as being fixed with respect to the hub axle 12, and the magnet (rotor 76) is illustrated as being fixed with respect to the hub body 14. Alternatively, the winding coil 74A can be fixed with respect to the hub body 14 and the magnet (rotor 76) can be fixed with respect to the hub axle 12.

The hub assembly 10A comprises a user input device 80. The user input device 80 can be, for example, a reset switch that forces power off to the electric component 52. Alternatively, the user input device 80 can be configures to volume change one or more parameters such as, for example, a threshold value. Here, the user input device 80 is a push switch that includes an operated member 80A and a base member 80B. The operated member 80A is movably relative to the base member 80B. The base member 80B includes an electrical circuit that is normally in either an open state or a closed state. The open state or the closed state of the electrical circuit is changed to the other state in response to the movement of the operated member 80A being moved (e.g., pushed in the illustrated embodiment) relative to the base member 80B.

When a user operates (e.g., pushes) the operated member 80A, an input signal is produced that is transmitted to the electric component 52 via an electrical cable 82. In this way, the user input device 80 is electrically coupled to the electric component 52. In particular, in the illustrated embodiment, the user input device 80 is electrically connected to the electric circuit board 56 via the electrical cable 82. In this way, the user input device 80 is electrically connected to the electric circuit board 56. With this arrangement, the user input device 80 does not include a wireless communication receiver. In the illustrated embodiment, the hub axle has a cable receiving passageway 12f for receiving the electrical cable 82. The cable receiving passageway 12f axially extends between the electric component 52 and the user input device 80. Thus, the user input device 80 is spaced from in an axial direction with respect to the electric component 38.

The user input device 80 is configured to be operated by a user without having to disassemble the hub assembly 10A. Also, preferably, the user input device 80 is configured to be operated by a user while the hub assembly 10A is mounted to the vehicle body VB of the human-powered vehicle V. Here, the user input device 80 is disposed outside of the hub body 14. In particular, the user input device 80 is disposed inside of the sprocket support body 24. Preferably, the user input device 80 is disposed between the first bearing 30 and the axial end 12a of the hub axle 12. Also, preferably, the user input device 80 is located on an axial outward side of the double nut 34 with respect to the rotational center axis A1, and at least partly aligned with the double nut 34 in the axial direction. Preferably, the first tool engagement structure 36b is located radially outside the user input device 80. More preferably, the second tool engagement structure 38b is located radially outside the user input device 80. In this way, the user input device 80 operated by a user. The user input device 80 is an electric component (e.g., an electric switch) that is located adjacent the first axial end 12a of the hub axle 12. Alternatively, the user input device 80 (i.e., the electric component) can be located adjacent the second axial end 12b of the hub axle 12. Thus, broadly speaking, in the hub assembly 10A, an electric component 52 is located adjacent an axial end of the hub axle 12 on an axial outward side of the double nut 34 with respect to the rotational center axis A1.

Here, as seen in FIG. 5, the hub assembly 10A further comprises an end cap 84 that disposed on an axial end of the hub axle 12. Here, the end cap 84 is disposed on the first axial end 12a of the hub axle 12. The end cap 84 supports the user input device 80 to the hub axle 12. The user input device 80 is operably accessible through an opening 84a in the end cap 84. Also, the electrical cable 78 enters the hub assembly 10A thorough an opening 54b of the end cap 84. Then, the electrical cable 78 extends axially along the hub axle 12 and enters the housing 54 of the electric component 52. Preferably, as in the illustrated embodiment, the electrical cable 78 is disposed in a cable receiving passageway 12g of the hub axle 12 as seen in FIG. 5. Here, the cable receiving passageway 12g is an axially extending recess or groove. In this way, the electrical cable 78 can be located in the cable receiving passageway 12g that extends from the electric component 52 to the first axial end 12a of the hub axle 12.

The end cap 84 further includes a rotation restriction part 84c. The rotation restriction part 84c is configured to couple the hub axle 12 to the vehicle body VB of the human-powered vehicle V so that rotation of the hub axle 12 relative to the vehicle body VB is restricted. The rotation restriction part 84c engages the rear frame body RB so that rotation of the hub axle 12 relative to the rear frame body RB is restricted. Thus, the rotation restriction part 84c is detachably attached to the hub axle 12.

Figure 10:
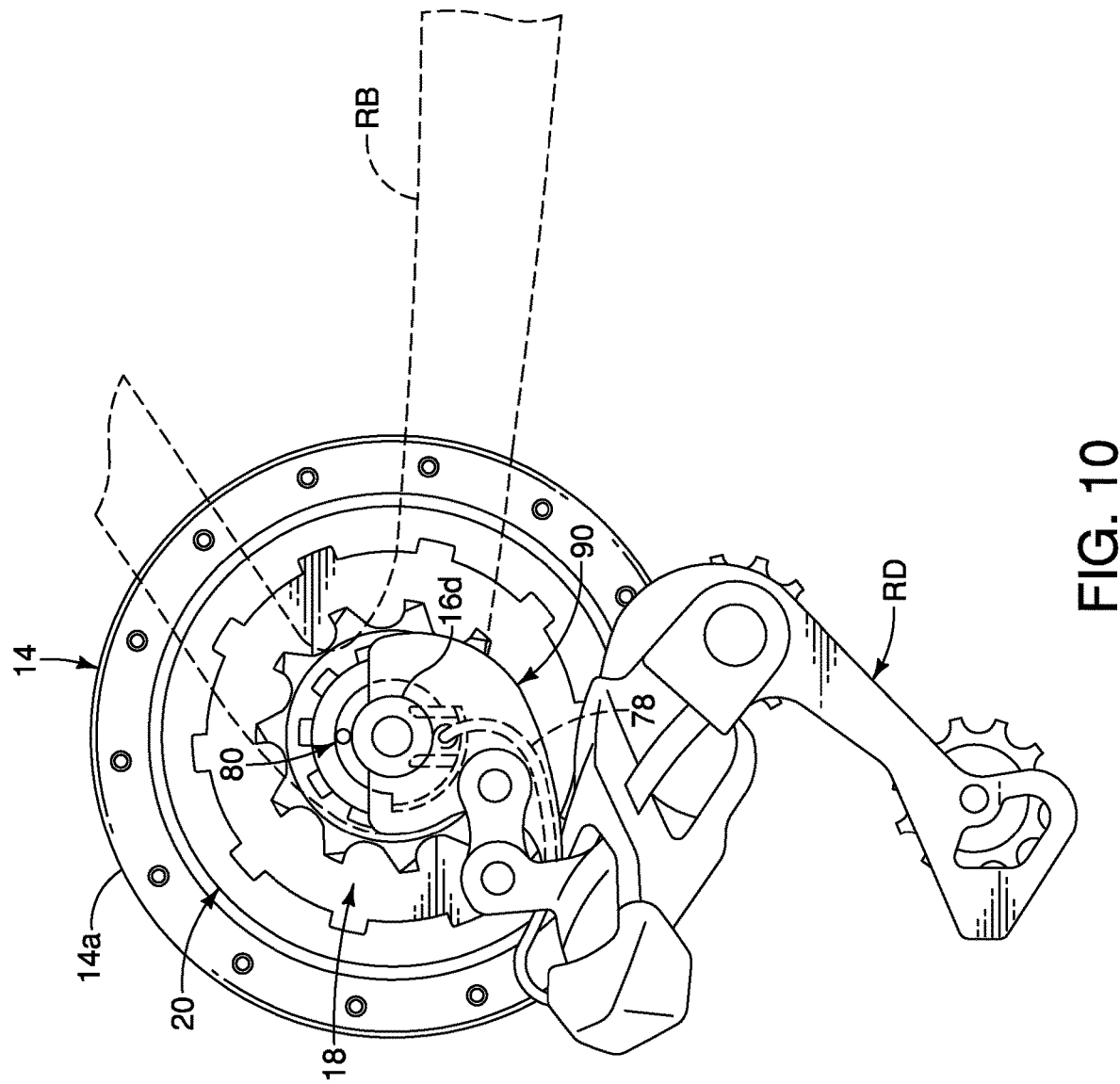
FIG. 10 is a side elevational view of a rear derailleur and the hub assembly illustrated in FIGS. 2 to 5 coupled to a vehicle body of the human-powered vehicle in which a cover has been provided to the vehicle body to cover an electrical cable connecting the rear derailleur and the hub assembly.

Referring now to FIG. 10, the hub assembly 10A is electrically connected to the rear derailleur RD by the electrical cable 78. Here, optionally, a cover 90 is snap-fitted onto the rear frame body RB or cover the U-shaped axle attachments that each have an open-ended slot or dropout that receives a portion of the skewer 16a. Thus, the hub assembly 10A cannot be removed from the rear frame body RB without removing the cover 90. Removing the cover 90 reminds a user to disconnect the electrical cable 78 from the rear derailleur RD before removing the hub assembly 10A from the rear frame body RB. The same configuration can be adopted for other electric components other than the rear derailleur RD.

Figure 11:
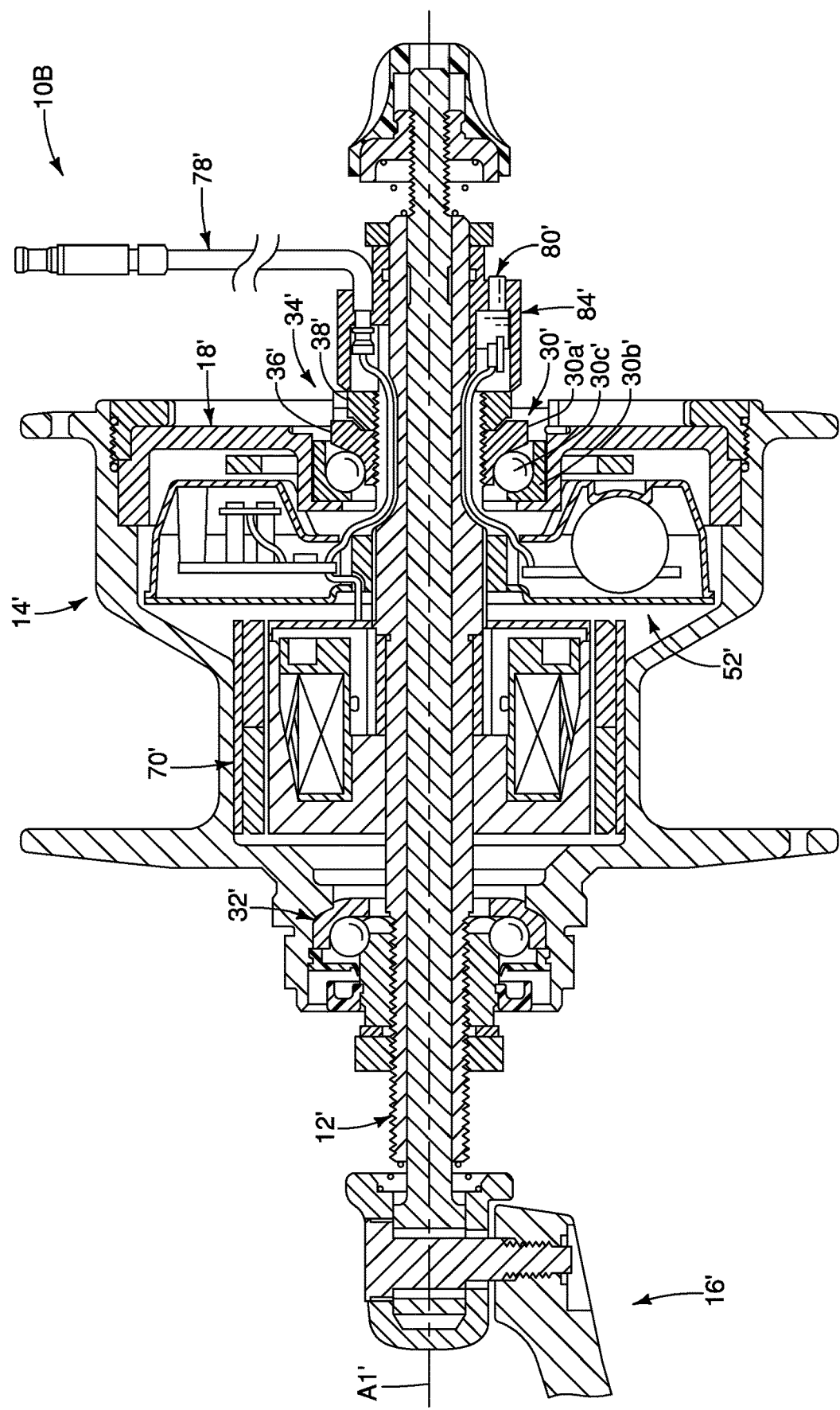
FIG. 11 is a longitudinal cross-sectional view of a front hub assembly of the human-powered vehicle illustrated in FIG. 1.

Referring now to FIG. 11, the hub assembly 10B will now be briefly discussed. Similar to the hub assembly 10A, the hub assembly 10B is a hub dynamo for providing electric power to one or more components of the human-powered vehicle V. The structure of the hub assembly 10B is the same as the structure of the hub assembly 10A, except that the hub assembly 10B is not configured with a sprocket support structure. Thus, for the sake of brevity, the parts of the hub assembly 10B that are the same as the corresponding parts of the hub assembly 10A will not be discussed again with respect to the hub assembly 10B. Thus, the following description will focus on the differences of the hub assembly 10B from the hub assembly 10A.

Basically, the hub assembly 10B comprises a hub axle 12' and a hub body 14'. The hub body 14' is rotatably mounted on the hub axle 12' to rotate around a rotational center axis A1' of the hub assembly 10B. The hub assembly 10B further comprises a wheel holding mechanism 16' that is the same as the wheel holding mechanism 16 but shorter in the axial direction.

The hub assembly 10B further comprises a first bearing 30' and a second bearing 32'. The first bearing 30' rotatably supports a first end of the hub body 14' on the hub axle 12'. In particular, the first bearing 30' rotatably supports an end wall 18' of the hub body 14'. The second bearing 32' rotatably supporting a second end of the hub body 14' on the hub axle 12'. Here, the hub assembly 10B further comprises a double nut 34'. The double nut 34' is threaded onto the hub axle 12'. The double nut 34' includes a first nut 36' and a second nut 38'. Preferably, the first nut 36' and the second nut 38' are at least partially disposed inside of the hub body 14' (i.e., a rotating body). Here, the first nut 36' is a part of the first bearing 30' similar to the first embodiment. In particular, the first nut 36' includes an inner race of the first bearing 30'. More specifically, the first bearing 30' includes an inner race 30a' (the first nut 36'), an outer race 30b' and a plurality of roller elements 30c'. The inner race 30a' (the first nut 36') is threadedly engaged to the hub axle 12'. The outer race 30b' supports the end wall 18' of the hub axle 12'. The roller elements 30c' are disposed between the inner race 30a' and the outer race 30b'.

Similar to the hub assembly 10A, the hub assembly 10B further includes comprises an electric component 52', an electric power generator 70' and a user input device 80'. The electric component 52' is identical to the electric component 52, which is discussed above. The electric power generator 70' is identical to the electric power generator 70, which is discussed above. The user input device 80' is identical to the user input device 80, which is discussed above. However, a modified end cap 84' is used to mount the user input device 80' to the hub axle 12'. Here, the end cap 84' is configured so that an electrical cable 78' of the electric component 52' extends upwardly from the hub axle 12' where the hub assembly 10B is mounted to the human-powered vehicle V.

Figure 12:
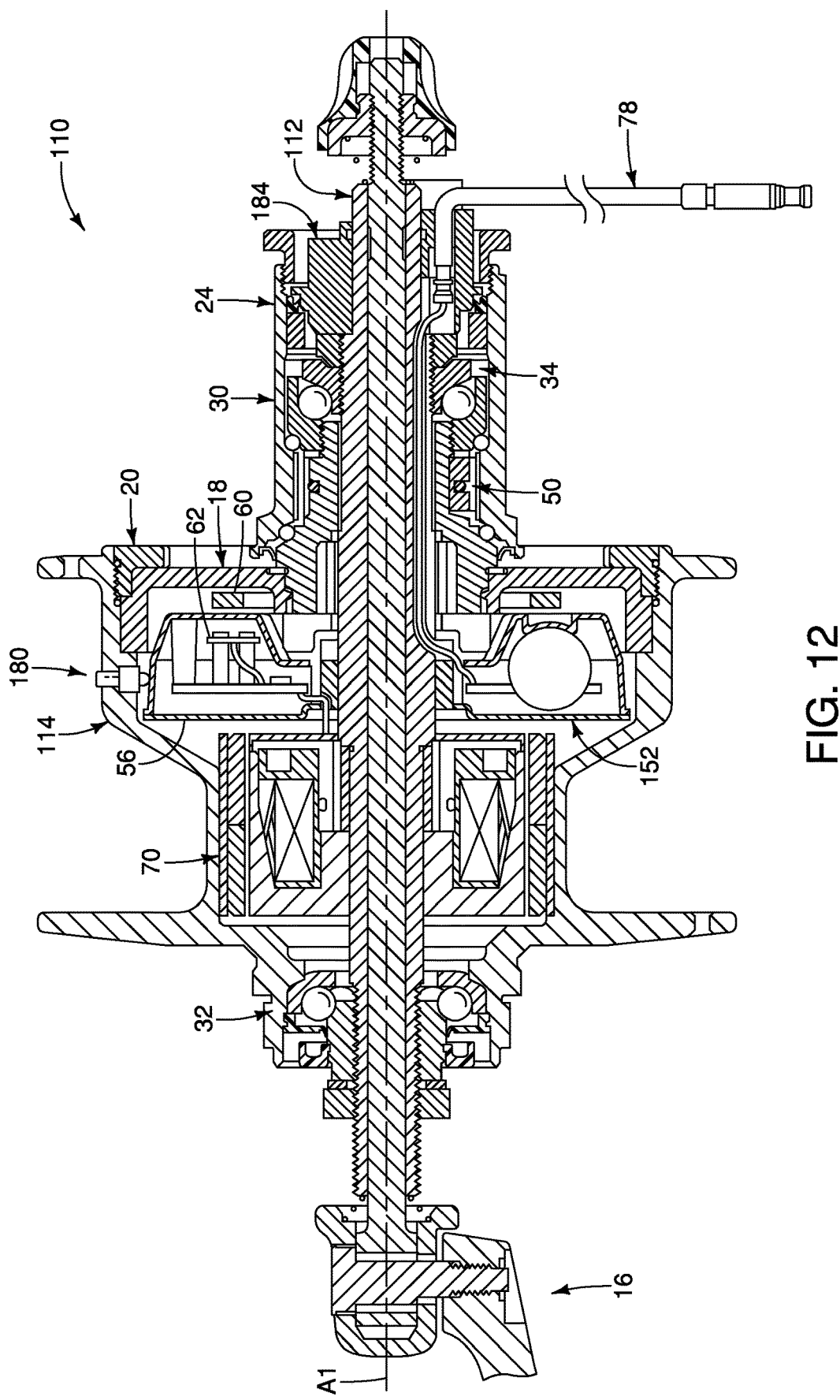
FIG. 12 is a longitudinal cross-sectional view of a modified hub assembly for the human-powered vehicle illustrated in FIG. 1.

Referring now to FIG. 12, a modified hub assembly 110 is illustrated in accordance with an alternative embodiment. In view of the similarity between the hub assembly 110 and the hub assembly 10A, the parts of the hub assembly 110 that are identical to the hub assembly 10A will be given the same reference symbol used for the hub assembly 10A. Thus, the following description will focus on the differences of the hub assembly 110 from the hub assembly 10A.

Basically, the hub assembly 110 comprises a hub axle 112 and a hub body 114. The hub body 114 is rotatably mounted on the hub axle 112 to rotate around a rotational center axis A1 of the hub assembly 110. Here, the hub axle 112 and the hub body 114 have been modified to have an electric component 152 and a user input device 180 where the user input device 180 is provided to the hub body 114. Thus, in this embodiment, the user input device 180 is disposed inside of the hub body 114. Since the hub body 114 rotates relative to the electric component 152, the user input device 180 will rotate with the hub body 114. The user input device 180 can be electrically connected to the electric component 152 by using a mechanical connection in which a brush provided on one of the electric component 152 and the user input device 180 rotates relative to a resistor provided on the other one of the electric component 152 and the user input device 180. Alternatively, short-range wireless communication can be used to transmit an input signal from the user input device 180 to the electric component 152.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub assembly. Accordingly, these directional terms, as utilized to describe the hub assembly should be interpreted relative to a human-powered vehicle (e.g., bicycle) in an upright riding position on a horizontal surface and that is equipped with the hub assembly. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub assembly for a human-powered vehicle, the hub assembly comprising:
   a hub axle;
   a hub body rotatably mounted on the hub axle to rotate around a rotational center axis of the hub assembly;
   an electric component; and
   a user input device electrically coupled to the electric component.

2. The hub assembly according to claim 1, wherein
   the electric component includes an electric circuit board, and wherein
   the user input device is electrically connected to the electric circuit board.

3. The hub assembly according to claim 1, wherein
   the electric component is non-rotatably disposed with respect to the rotational center axis.

4. The hub assembly according to claim 1, wherein
   the electric component is disposed in the hub body.

5. The hub assembly according to claim 1, wherein
   the user input device is spaced from in an axial direction with respect to the electric component.

6. The hub assembly according to claim 1, wherein
   the user input device does not include a wireless communication receiver.

7. The hub assembly according to claim 1, wherein
   the hub axle includes a cable receiving passageway axially extending between the electric component and the user input device.

8. The hub assembly according to claim 1, further comprising
   a first bearing rotatably supporting a first end of the hub body on the hub axle; and
   a second bearing rotatably supporting a second end of the hub body on the hub axle, and wherein
   the electric component is disposed between the first bearing and the second bearing, and the user input device is disposed between the first bearing and an axial end of the hub axle.

9. The hub assembly according to claim 1, wherein
   the user input device is disposed outside of the hub body.

10. The hub assembly according to claim 1, wherein
    the user input device is disposed inside of the hub body.

11. The hub assembly according to claim 1, further comprising
    a sprocket support body rotatably disposed around the rotational center axis to transmit a driving force to the hub body while rotating in a driving rotational direction around the rotational center axis.

12. The hub assembly according to claim 11, wherein
    the user input device is disposed inside of the sprocket support body.

13. The hub assembly according to claim 1, further comprising
    an end cap disposed on an axial end of the hub axle, and
    the user input device is operably accessible through an opening in the end cap.

14. The hub assembly according to claim 13, wherein
    the end cap includes a rotation restriction part configured to couple the hub axle to a vehicle body of the human-powered vehicle so that rotation of the hub axle relative to the vehicle body is restricted.

15. The hub assembly according to claim 1, further comprising
    a double nut including a first nut having a first tool engaging structure and a second nut having a second tool engaging structure, and wherein
    the first nut and the second nut are threadedly engaged with an external thread of the hub axle,
    the first tool engaging structure and the second tool engaging structure face outward in an axial direction,
    the first tool engaging structure is disposed radially outward of the second tool engaging structure with respect to the rotational center axis when viewed from the axial direction.

16. The hub assembly according to claim 15, wherein the user input device is located on an axial outward side of the double nut with respect to the rotational center axis, and at least partly aligned with the double nut in the axial direction.

17. The hub assembly according to claim 15, wherein the first tool engaging structure and the second tool engaging structure are accessible with a tool in the axial direction.

18. The hub assembly according to claim 15, further comprising
a first bearing rotatably supporting a first end of the hub body on the hub axle; and
a second bearing rotatably supporting a second end of the hub body on the hub axle, and wherein
the first nut includes an inner race that supports a plurality of rolling elements of the first bearing.

19. The hub assembly according to claim 1, further comprising
an electric power generator provided to the hub body, and configured to generate electric power by rotation of the hub body.

20. The hub assembly according to claim 19, wherein the electric component includes at least one capacitor electrically connected to the electric power generator.

21. A hub assembly for a human-powered vehicle, the hub assembly comprising:
a hub axle;
a rotating body rotatably mounted on the hub axle to rotate around a rotational center axis of the hub assembly; and
a double nut including a first nut having a first tool engaging structure and a second nut having a second tool engaging structure, the first nut and the second nut being threadedly engaged with an external thread of the hub axle, the first tool engaging structure and the second engaging structure facing outward in an axial direction with respect to the rotational center axis,
the first tool engaging structure being disposed radially outward of the second tool engaging structure with respect to the rotational center axis when viewed from the axial direction.

22. The hub assembly according to claim 21, further comprising
an electric component located adjacent an axial end of the hub axle on an axial outward side of the double nut with respect to the rotational center axis.

23. The hub assembly according to claim 22, further comprising
a detected part disposed on the rotating body, and
a rotation detection sensor configured to detect the detected part,
the electric component is disposed on the hub axle and includes the rotation detection sensor.

24. The hub assembly according to claim 21, further comprising
a first bearing rotatably supporting a first end of the rotating body on the hub axle; and
a second bearing rotatably supporting a second end of the rotating body on the hub axle, and wherein
the first nut includes an inner race of the first bearing.

25. The hub assembly according to claim 21, wherein the first nut and the second nut are disposed inside of the rotating body.

* * * * *